(12) United States Patent
Browne et al.

(10) Patent No.: US 8,736,967 B1
(45) Date of Patent: May 27, 2014

(54) ANAMORPHIC EYEPIECE

(75) Inventors: Michael P. Browne, San Mateo, CA (US); Brett Bryars, San Francisco, CA (US)

(73) Assignee: SA Photonics, Inc., San Francisco, CA (US)

( * ) Notice: Subject to any disclaimer, the term of this patent is extended or adjusted under 35 U.S.C. 154(b) by 590 days.

(21) Appl. No.: 12/950,143

(22) Filed: Nov. 19, 2010

(51) Int. Cl.
*G02B 27/01* (2006.01)

(52) U.S. Cl.
USPC ........................................................ 359/668

(58) Field of Classification Search
USPC ......................................... 359/630, 631, 668
See application file for complete search history.

(56) References Cited

U.S. PATENT DOCUMENTS

| | | |
|---|---|---|
| 3,410,629 A | 11/1968 | Carpenter et al. |
| 5,473,365 A * | 12/1995 | Okamura .......................... 348/53 |
| 5,726,807 A | 3/1998 | Nakaoka et al. |
| 6,075,644 A | 6/2000 | Filipovich |
| 6,201,641 B1 | 3/2001 | Filipovich |
| 6,462,894 B1 | 10/2002 | Moody |
| 7,072,107 B2 | 7/2006 | Filipovich et al. |
| 7,158,296 B1 | 1/2007 | Schwartz, II et al. |
| 7,289,272 B2 | 10/2007 | Bowron et al. |
| 7,307,793 B2 | 12/2007 | Ottney et al. |
| 7,381,952 B2 | 6/2008 | Teich et al. |
| 2004/0227703 A1 * | 11/2004 | Lamvik et al. .................. 345/76 |
| 2012/0182326 A1 * | 7/2012 | Moore .......................... 345/690 |

OTHER PUBLICATIONS

Moore, S.A., "Anamorphic Eyepiece for Increased Field of View," International Optical Design Conference (IODC), Jun. 13, 2010, Jackson Hole, WY, 5 pages.*

* cited by examiner

*Primary Examiner* — Joseph P Martinez
(74) *Attorney, Agent, or Firm* — Fenwick & West LLP

(57) ABSTRACT

An anamorphic eyepiece. In one implementation, the eyepiece is for use with a display where both the eyepiece and display are head-mounted, with the eyepiece projecting an image from the display into the user's eye. The display has high resolution in a horizontal direction, preferably at least 2000 pixels, but the image produced by the display is compressed in aspect ratio. The anamorphic eyepiece decompresses the aspect ratio.

37 Claims, 8 Drawing Sheets

ANAMORPHIC EYEPIECE

GOVERNMENT RIGHTS LEGEND

This invention was made with government support under Phase I SBIR Government contract FA8650-08-M-6892 and Phase II SBIR Government contract FA8650-09-C-6018 awarded by the United States Air Force. The government has certain rights in the invention.

BACKGROUND

1. Field of Art

This invention generally relates to eyepieces used to project an image from a small display into the eye, for example as may be used with head or helmet mounted night vision systems.

2. Description of the Related Art

In certain applications, a small display in close proximity to a user's eye produces an image and an eyepiece projects that image into the user's eye. In this way, the user sees the image produced by the display. The image may be real, enhanced or virtual. It may replace, augment or overlay what the user would normally see. For example, in a virtual reality system, the user's natural surroundings may be blocked out and replaced entirely by images of a virtual world projected from the display system. A user might be sitting in his living room with rainy weather outside, but the display system projects images of a sunny beach instead. In an augmented or enhanced reality system, additional images may be added to the user's natural surroundings. For example, the user might be sitting in his office facing a blank wall, and the display system projects images so that it appears as if a computer screen is located on the wall. As another example, a pilot might be flying at night, and the display system projects night vision images or thermal infrared images over the otherwise dark outside. The display system may also project other information, such as the aircraft's heading, speed, attitude, etc.

Whatever the application, the display and eyepiece preferably are small, lightweight and low cost. However, wider field of view and higher resolution are also desirable. These requirements are inherently in conflict. Wider field of view and higher resolution typically means that the display and/or eyepiece will be larger, heavier and/or more costly. Currently available displays that meet typical requirements regarding size, weight and cost, often leave room for improvement with respect to field of view and/or resolution.

Thus, there is a need for approaches that can improve on currently available systems.

SUMMARY

The present invention overcomes the limitations of the prior art by providing an anamorphic eyepiece. In one implementation, the eyepiece is for use with a display where both the eyepiece and display are positioned close to the eye, with the eyepiece projecting an image from the display into the user's eye. The display has high resolution in a horizontal direction, preferably at least 1600 pixels, but the display is compressed in aspect ratio. The anamorphic eyepiece decompresses the aspect ratio so that the image viewed by the user has the correct aspect ratio.

Other aspects of the invention include systems and applications for the eyepiece described above, and methods corresponding to all of the foregoing.

BRIEF DESCRIPTION OF DRAWINGS

FIGS. 1b and 1c are a front view and right side view of the helmet-mounted vision system of FIG. 1a.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1A:
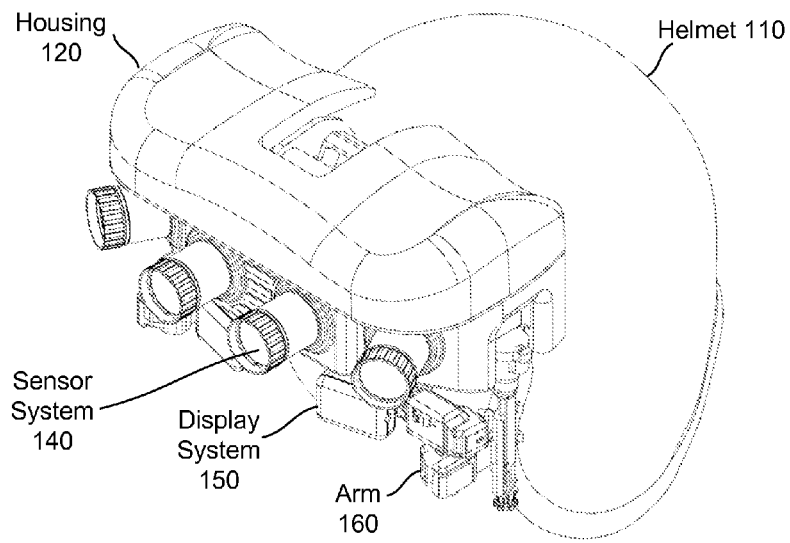
FIG. 1a is a perspective view of a helmet-mounted vision system using an anamorphic eyepiece according to the invention.
Figures 1B, 1C:
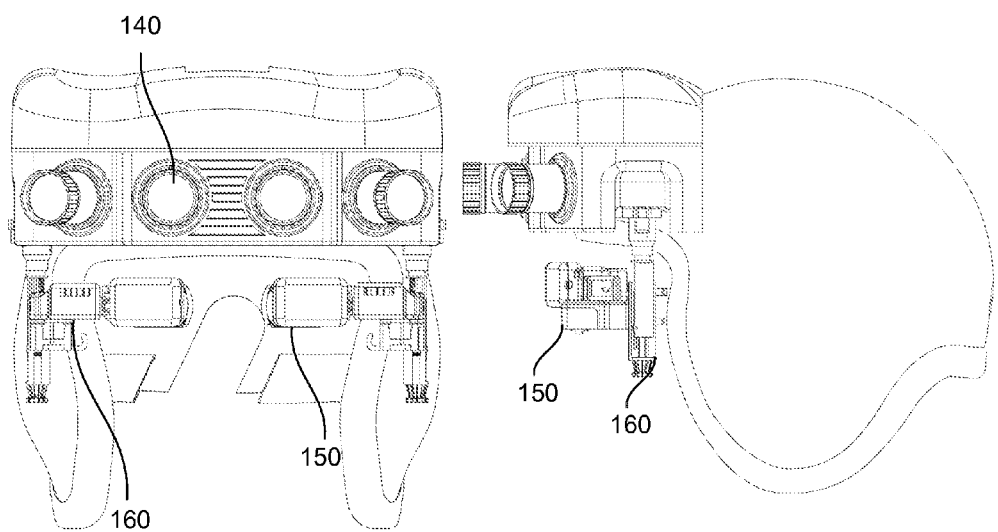

FIGS. 1a-1c show a helmet-mounted vision system that uses a display system according to the invention. This example is a night vision system. The system 100 includes a helmet 110, housing 120, four sensor systems 140 and two display systems 150. Two sensor systems 140 and one display system 150 are allocated to each eye.

The sensor systems 140 include an objective lens and digital sensor (e.g., CCD). These systems 140 receive as input low intensity ambient light from the surroundings. The captured images are output in an electrical format, and can be manipulated, stored, and transmitted by electronic devices such as a processor. In this example, a processor is located under housing 120. The captured digital images are passed from the sensor systems 140 to the processor. The processor forms a wide field of view image for each eye by stitching together the images from two sensor systems 140.

The processor sends each resulting wide-field image to the corresponding display system 150. Each display system 150 includes a display and an eyepiece. The display produces the wide-field image and the eyepiece projects the image into the user's eye. Examples of display technology that may be used include liquid crystal displays (LCD), liquid crystal on silicon (LCOS) displays, plasma displays, light emitting diode (LED) displays, or organic light emitting diode (OLED) displays. As will be described in further detail below, the image from the display has a compressed aspect ratio in order to achieve the desired resolution, so the eyepiece is anamorphic in order to decompress the aspect ratio.

Figure 2:
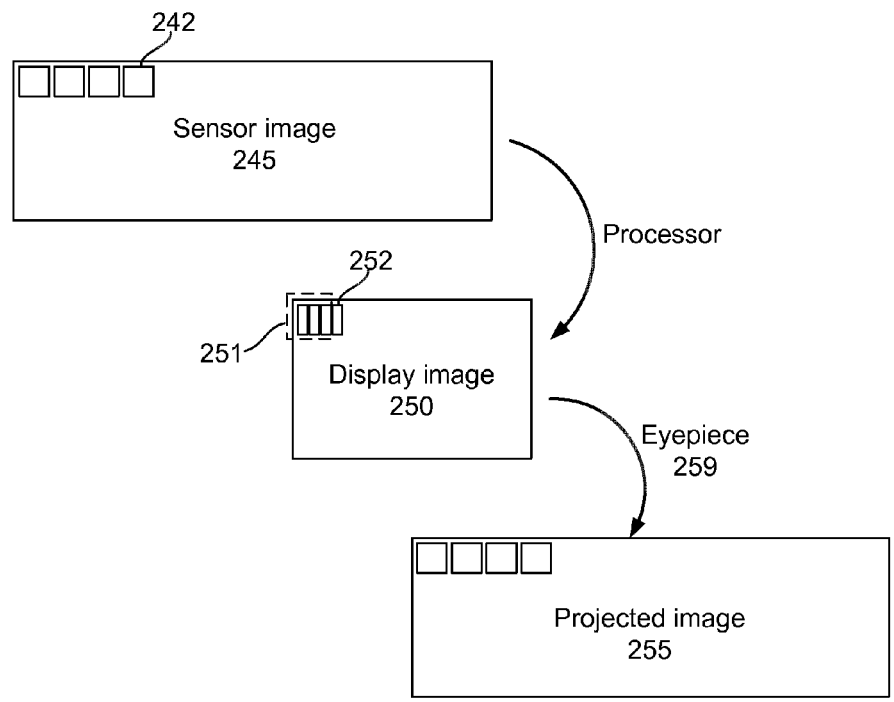
FIG. 2 is a diagram illustrating the rectangular subpixels of a display.

FIG. 2 illustrates this process for one eye. In this particular example, two sensor systems 140 are allocated to each eye and together they capture an image 245 that is 2800 pixels wide. The image that falls on the sensors will be referred to as the sensor image 245. In this application, the sensor image 245 corresponds to a 55 horizontal degree field of view due to the specific objective lens used. The captured sensor image 245 must now be projected into the user's eye in a way that covers a 55 degree field of view.

The display 250 within system 150 is a color display with 1280 color pixels 251 in the horizontal direction, but this is not enough resolution to display the 2800 pixel wide image 245. However, each color pixel 251 is composed of three color stripes (or subpixels) 252. Thus, while the display 250 has only 1280 color pixels 251 in the horizontal direction, it also has 3840 subpixels 252 in the horizontal direction. The 2800 pixel wide image 245 is mapped onto the 3840 pixels. That is, the color subpixels 251 in the display are used as three separate monochrome pixels 252 rather than as one three-color pixel.

However, this compresses the image in the horizontal direction. That is, the aspect ratio of the display 250 is compressed relative to the aspect ratio of the original sensors 245. Since one color pixel 251 is now used as three monochrome pixels 252, the aspect ratio is compressed by approximately 3:1 (ignoring other factors). The anamorphic eyepiece 259 expands the aspect ratio, so that the final projected image 255 seen by the user has the same aspect ratio as the original sensor image 245. That is, if the display image were projected without anamorphism, it would cover less than a 55 degree horizontal field of view. However, the anamorphic eyepiece stretches the image horizontally, thus covering the same 55 degree horizontal field of view as the original image.

For systems that split a single color pixel into multiple monochrome pixels, the most common splitting ratios are 2:1 and 3:1. That is, one color pixel has two stripes which are now used as two separate monochrome pixels, or else one color pixel has three stripes which are now used as three separate monochrome pixels (as shown in FIG. 2). This results in a compression of the aspect ratio by a factor of 2:1 or 3:1. Common resolutions that can be achieved using this approach include 1600×600, 2400×600, 2048×768, 3072×768, 2560×1024, 3840×1024, 3200×1200, 4800×1200, 3840×1080, 5760×1080, 3840×1200 and 5760×1200. Note that these all have horizontal resolutions of at least 1600 pixels and most have horizontal resolutions of at least 2000 pixels or 3000 pixels. A few even have horizontal resolutions of at least 5000 pixels. Monochrome displays that can achieve the above resolutions are difficult to find in reasonable sizes, weights and costs. Advances in technology may be able to push displays to greater pixel resolutions in the future, but whatever the current resolution, the approach described here can potentially increase it by a factor of 2 to 3.

Figure 3:
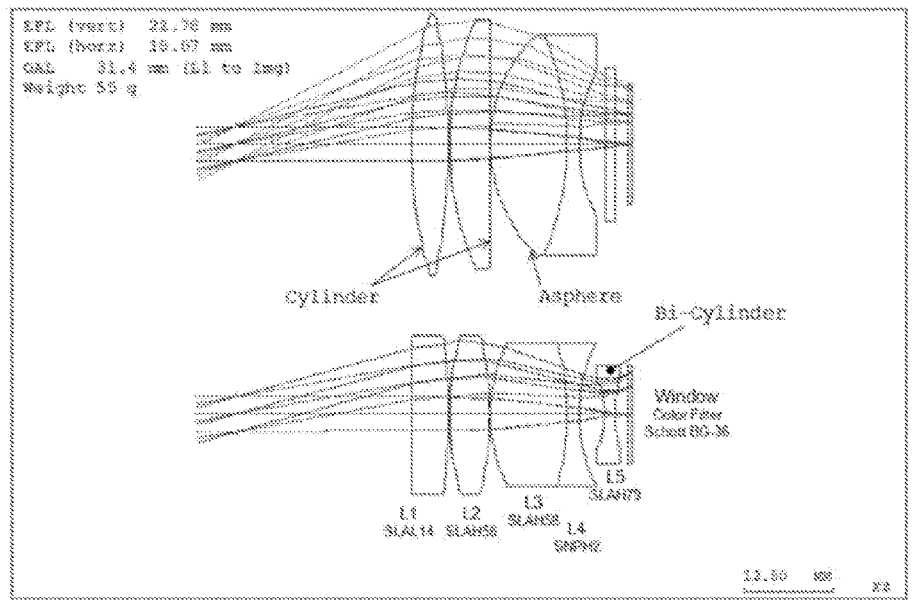
FIG. 3 is a diagram of an anamorphic eyepiece that transforms the rectangular display subpixels into square image pixels.
Figure 4A:
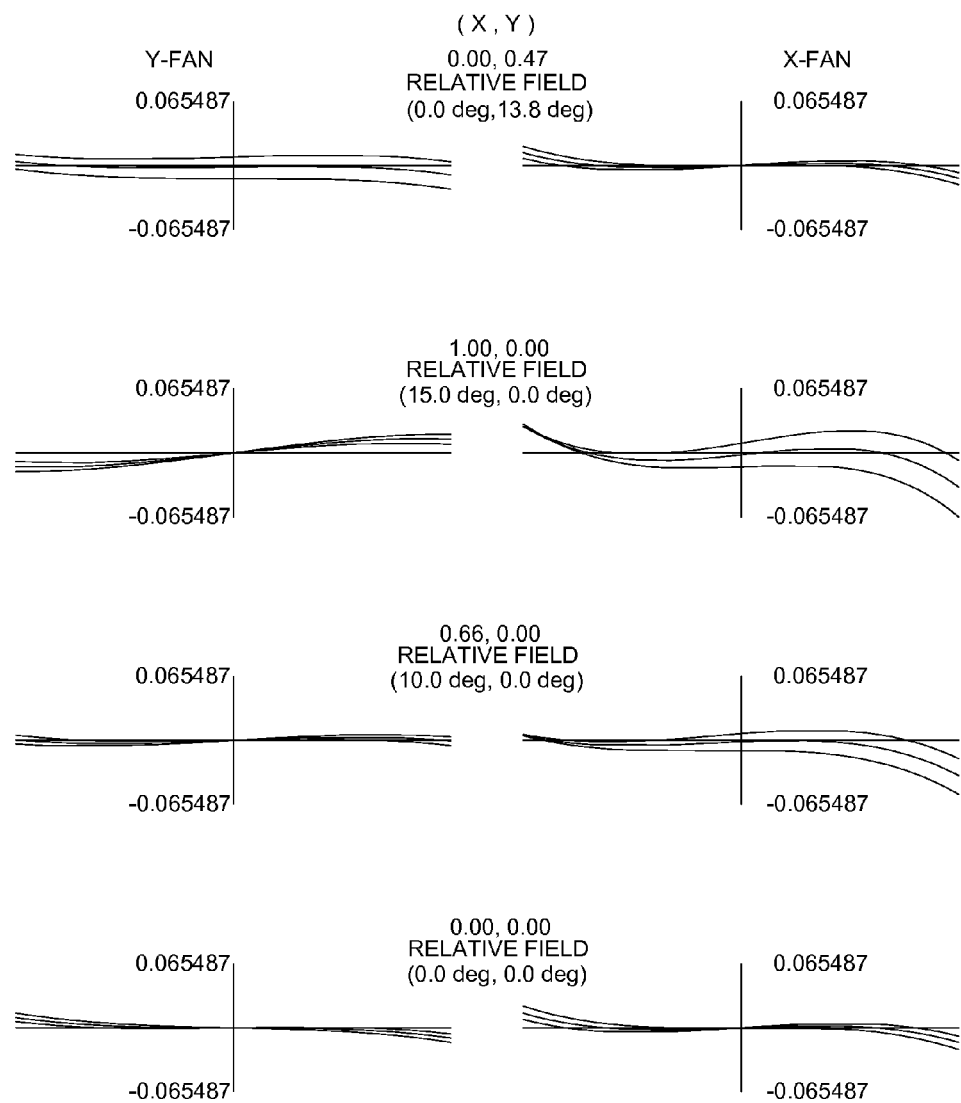
FIGS. 4a-4d are rim ray plots for the anamorphic eyepiece of FIG. 3.
Figure 4B:
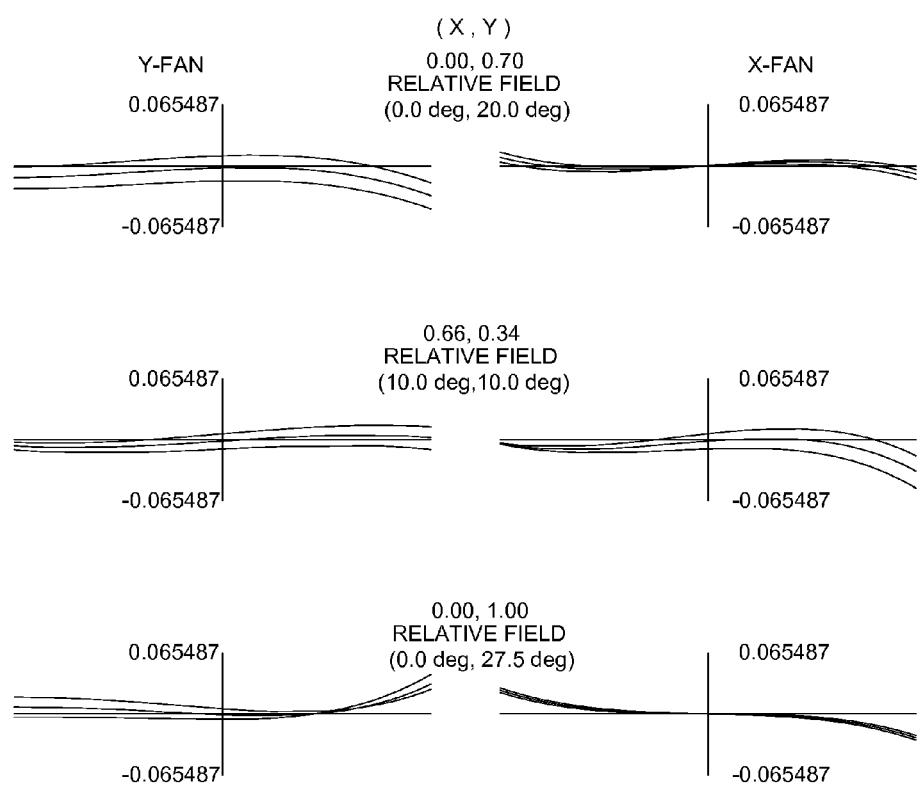
Figure 4C:
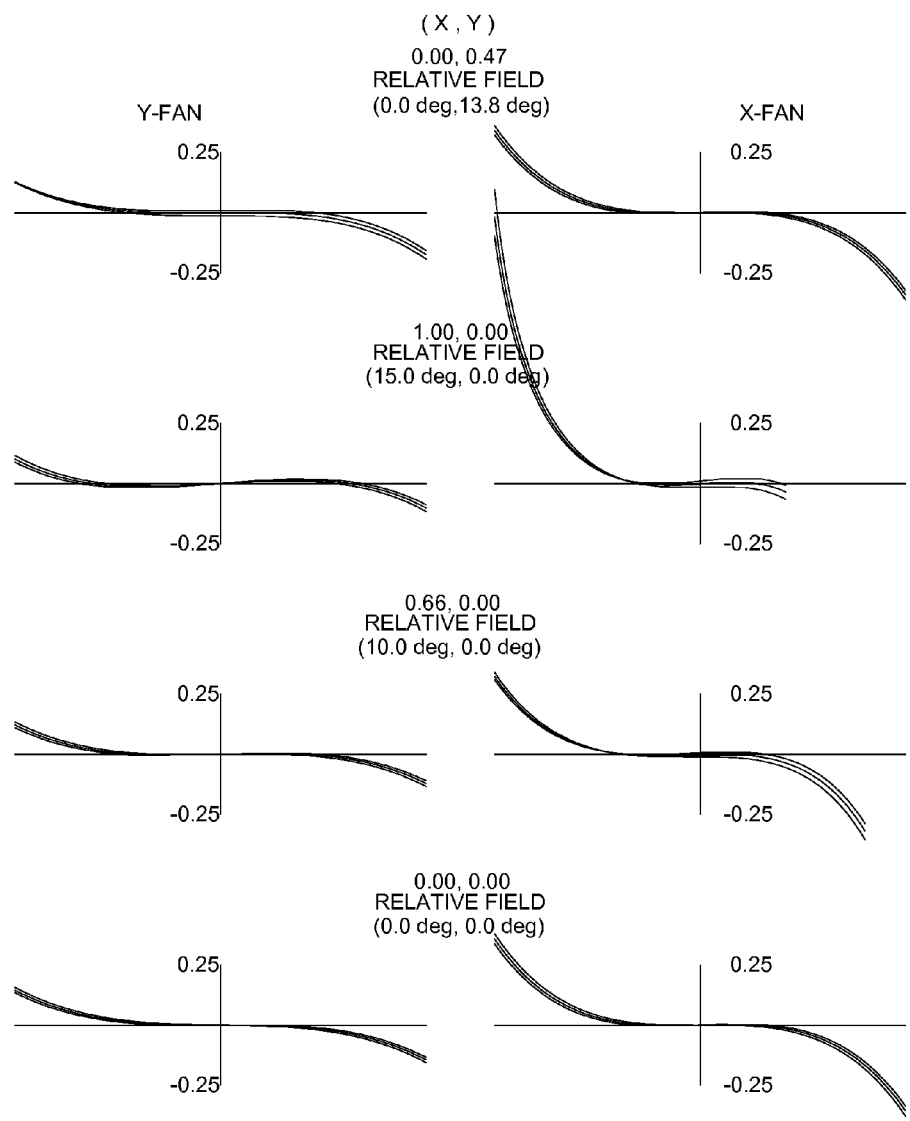
Figure 4D:
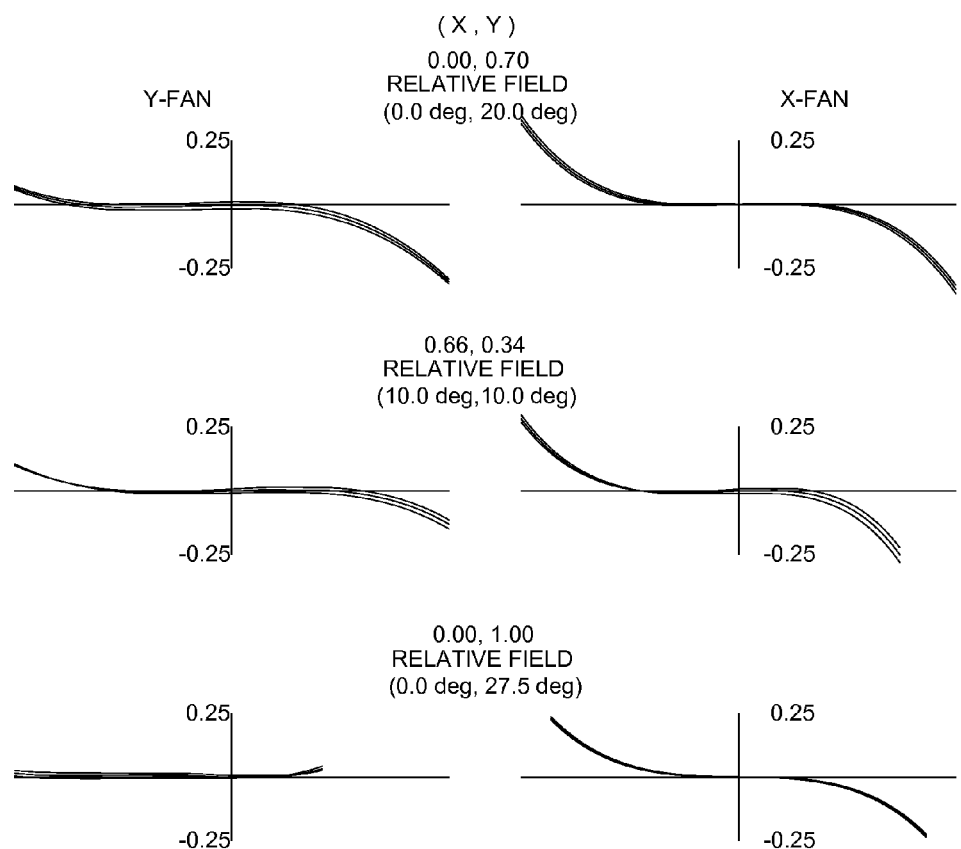
Figure 5:
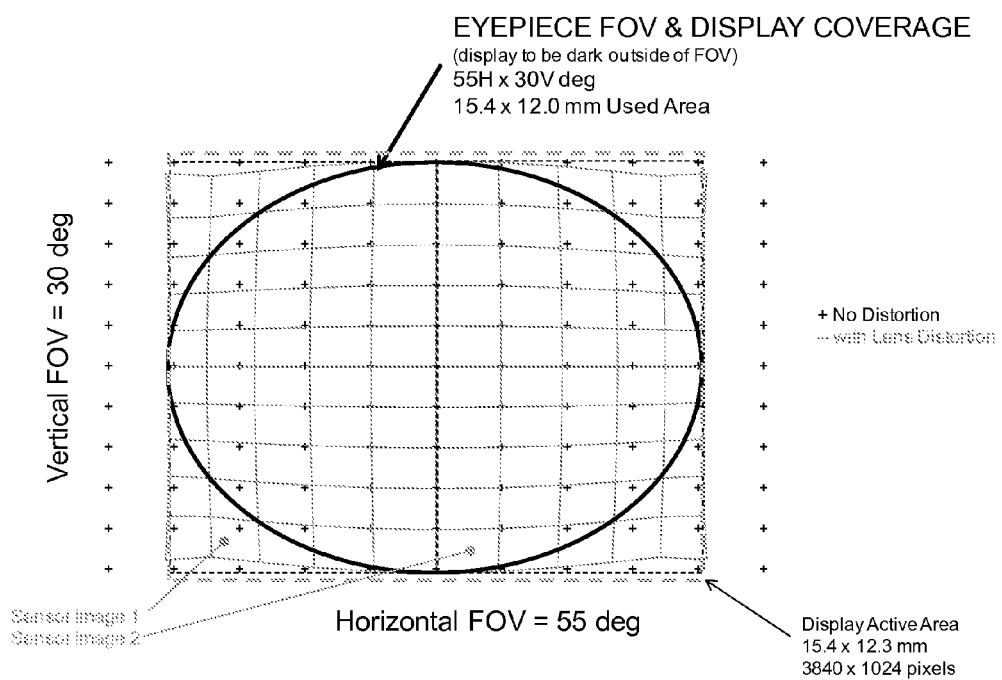
FIG. 5 is a distortion plot for the anamorphic eyepiece of FIG. 3.

FIGS. 3-5 describe an example anamorphic eyepiece. This particular example produces an anamorphic stretching in the horizontal direction of approximately 1.5. In many applications, the aspect ratio is expanded by at least a factor of 1.5, 2.0 or even 3.0. FIG. 3 is a diagram of the optical train of the anamorphic eyepiece. Appendix 1 below gives the optical prescription of the eyepiece.

In FIG. 3, the pupil 310 of the eye is on the left, and the display 250 is on the right. Since light is traveling from the display to the eye, L5 is actually the first element in the optical train and L1 is the last element. The eyepiece has five lens element L1-L5s, two of which L3/L4 are combined into a doublet. The doublet does not contain a cylindrical surface, but it does have one aspheric surface. The other elements have cylindrical surfaces, including one bicylinder L5. Other than the asphere, all surfaces are either spherical or cylindrical. Lens elements L1 and L2 introduce cylindrical power in orthogonal directions. The doublet L3/L4 corrects for chromatic aberrations. Bicylinder L5 is a field flattener.

This particular design has an overall length of less than 30 mm between the outside surfaces of elements L1 and L5. Note that the optical train is not folded. Longer lengths, such as 35, 40, or 50 mm may be acceptable for certain applications. However, since the eyepiece is positioned directly in front of the eye, it is not desirable for the eyepiece to be too long. Similarly, the weight of this design is 55 grams. Lighter is typically better. This design is all glass. A plastic design may significantly reduce the weight, perhaps to below 40 grams. Designs above 100 grams are usually not desirable.

Regarding optical performance, the eye relief of the eyepiece preferably is at least 20 mm, more preferably at least 25 mm, and even more preferably at least 30 mm. The exit pupil preferably is at least 10, 12 or 15 mm on-axis; and 5, 7 or 10 mm off-axis.

Figure 6:
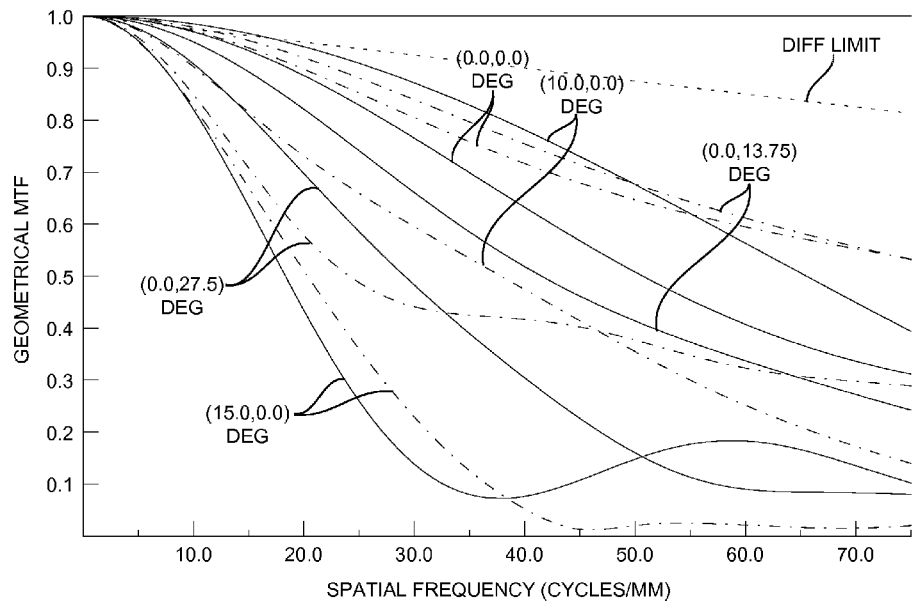
FIGS. 6 and 7 are MTF plots for the anamorphic eyepiece of FIG. 3.
Figure 7:
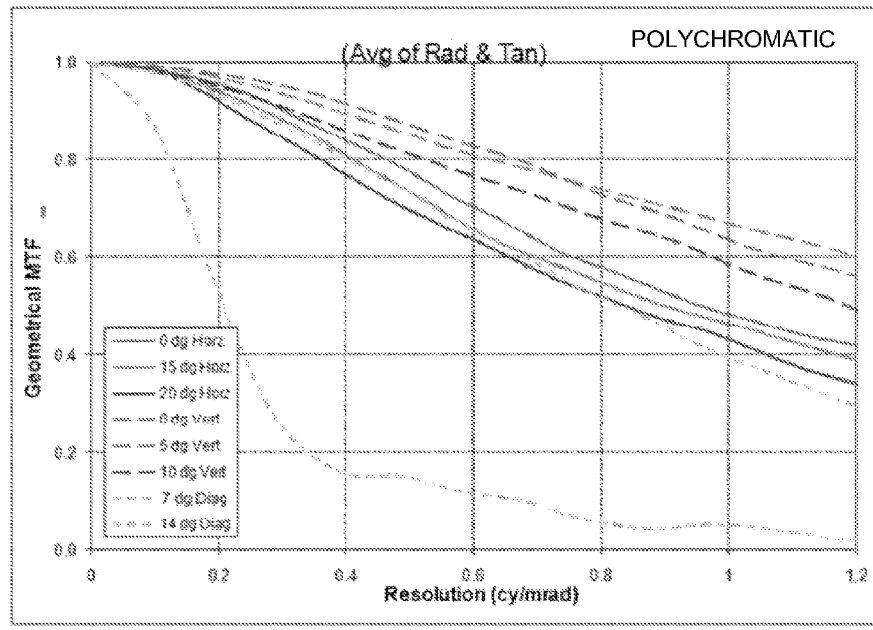

FIGS. 4a-4d are rim ray plots for the eyepiece of FIG. 3. FIGS. 4a-4b assume a 5 mm pupil and FIGS. 4c-4d assume a 12 mm pupil. The plots are for wavelengths 510 nm, 540 nm and 570 nm. The ray aberrations are measured in mm. FIG. 5 is a distortion plot for the eyepiece of FIG. 3. The anamorphic stretching can clearly be observed along with some barrel distortion. The barrel distortion can be corrected by processing the image before sending it to the display. MTF performance with a 5 mm pupil is shown in FIGS. 6 and 7 for both spatial and angular frequency. In FIG. 6, solid lines are Y MTFs and dashed lines are X MTFs. In the vertical direction, 45 cycles/mm corresponds to approximately 1.1 cycles/mrad. In the horizontal direction, 75 cycles/mm corresponds to approximately 1.1 cycles/mrad. The MTF shown is polychromatic, taking a weighted average over the 510-570 nm range. The MTF performance is difficult to optimize over a large field of view due to the anamorphic stretching and the overlap configuration which moves the effective center of the display away from the axis of the lens assembly.

FIG. 3 is merely an example. Other variations will be apparent. For example, if color correction is not needed, the doublet L3/L4 can be reduced at least to a singlet. This may be the case if the display were near monochromatic. This would reduce the lens design from five elements to four. As another example, some of the surfaces may be toroidal.

In addition, the display system was introduced in the context of a helmet mounted night vision system, but it is not limited to this application. Applications with a display system positioned near a user's eye are candidate applications for this type of eyepiece and display system. Examples include helmet-mounted and other head-mounted systems. For example, a clip or other fastener might be used to attach the display system to some head attachment device. Other applications include near to eye systems. Weapons sights, sights for non-weapons, electronic binoculars and telescopes (i.e., those which capture an image and then redisplay it), viewfinders for camcorders or other devices, and personal display systems (i.e., a device that projects images directly into the user's eye) are some examples. The source for the display can be any suitable source.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

APPENDIX 1

Optical Prescription of Anamorphic Eyepiece

| EP_BJB24 | | | |
|---|---|---|---|
| RDY | THI | RHD | GLA |
| OBJ: | INFINITY | −2000.0000C0 | |
| STO: | INFINITY | 25.0000C0 | |
| 2: | 65.29347 | 5.359525 | SLAL14_OHARA |
| SLB: "Lens1" | | | |
| CYL: | | | |
| RDX: | INFINITY | | |
| 3: | −87.67245 | 0.1250C0 | |
| 4: | 44.01107 | 5.633241 | SLAH58_OHARA |
| SLB: "Lens2" | | | |
| > 5: | INFINITY | 0.1250C0 | |
| CYL: | | | |
| RDX: | −51.84304 | | |
| 6: | 22.42172 | 10.896351 | SLAH58_OHARA |
| SLB: "Lens3" | | | |
| ASP: | | | |
| K: | 0.000000 | | |
| CUF: | 0.000000 | | |
| A: 0.473983E−05 B: −.242163E−08 C: 0.505635E−10 D: 0.238583E−12 | | | |
| 7: | −38.56682 | 1.750000 | SNPH2_OHARA |
| SLB: "Lens4" | | | |
| 8: | 22.23594 | 3.6246C3 | |
| 9: | INFINITY | 1.4000C0 | SLAH79_OHARA |
| SLB: "Lens5" | | | |
| CYL: | | | |
| RDX: | −11.48424 | | |
| 10: | INFINITY | 1.7862E9 | |
| CYL: | | | |
| RDX: | 17.05411 | | |
| 11: | INFINITY | 0.7000C0 | LAK9_SCHOTT |
| SLB: "BG36 Window" | | | |
| 12: | INFINITY | 0.0000C0 | |
| IHG: | INFINITY | 0.0000C0 | |

| SPECIFICATION DATA | | | | | | | |
|---|---|---|---|---|---|---|---|
| EPD | 5.00000 | | | | | | |
| DIM | MM | | | | | | |
| WL | 570.00 | 560.00 | 550.00 | 545.00 | 540.00 | 530.00 | 520.00 | 510.00 |
| REF | 4 | | | | | | |
| WTW | 2 | 37 | 53 | 60 | 58 | 21 | 20 | 11 |
| INI | BJB | | | | | | |
| XAN | 0.00000 | 10.00000 | 15.0000 | 0.0000 | 0.0000 | 10.0000 | 0.0000 | |
| YAN | 0.00000 | 0.00000 | 0.0000 | 13.7500 | 27.5000 | 10.0000 | 20.0000 | |
| WTF | 1.00000 | 1.00000 | 1.0000 | 1.0000 | 1.0000 | 1.0000 | 1.0000 | |
| VUX | 0.00000 | 0.00000 | 0.0000 | 0.0000 | 0.0000 | 0.0000 | 0.0000 | |
| VLX | 0.00000 | 0.00000 | 0.0000 | 0.0000 | 0.0000 | 0.0000 | 0.0000 | |
| VUY | 0.00000 | 0.00000 | 0.0000 | 0.0000 | 0.0000 | 0.0000 | 0.0000 | |
| VLY | 0.00000 | 0.00000 | 0.0000 | 0.0000 | 0.0000 | 0.0000 | 0.0000 | |

| INFINITE CONJUGATES | |
|---|---|
| EFL | 18.0710 |
| BFL | 0.1655 |
| FFL | 4.7055 |
| FNO | 3.6142 |
| AT USED CONJUGATES | |
| RED | −0.0091 |
| FNO | 3.6237 |
| OBJ DIS | −2000.0000 |
| TT | −1943.6000 |
| IRO DIS | 0.0000 |
| OAL | 56.4000 |
| PARAXIAL IMAGE | |
| HT | 6.5925 |
| THI | 0.0018 |
| ANG | 20.0000 |
| ENTRANCE PUPIL | |
| DIA | 5.0000 |
| THI | 0.0000 |

-continued

| EXIT PUPIL | |
|---|---|
| DIA | 19.2016 |
| THI | 69.5840 |

What is claimed is:

1. An anamorphic eyepiece for use in a display system configured to be positioned near a user's eye, the display system further comprising a display having at least 1600 pixels in a horizontal direction, the anamorphic eyepiece projecting an image produced by the display into the user's eye and expanding an aspect ratio of the projected image compared to an aspect ratio of the display, the anamorphic eyepiece comprising:
  a first cylindrical lens element with power in a first direction; and
  a second cylindrical lens element with power in a second direction that is orthogonal to the first direction.

2. The anamorphic eyepiece of claim 1 wherein the display has at least 2000 pixels.

3. The anamorphic eyepiece of claim 1 wherein the display has at least 3000 pixels.

4. The anamorphic eyepiece of claim 1 wherein the display has at least 5000 pixels.

5. The anamorphic eyepiece of claim 1 wherein the projected image spans a horizontal field of view of at least 40 degrees.

6. The anamorphic eyepiece of claim 1 wherein the projected image spans a horizontal field of view of at least 55 degrees.

7. The anamorphic eyepiece of claim 1 wherein the eyepiece expands the aspect ratio by at least a factor of 1.5.

8. The anamorphic eyepiece of claim 1 wherein the eyepiece expands the aspect ratio by at least a factor of 2.

9. The anamorphic eyepiece of claim 1 wherein the eyepiece expands the aspect ratio by at least a factor of 3.

10. The anamorphic eyepiece of claim 1 wherein the display comprises color pixels, each color pixel having at least two color stripes, each color stripe used as a monochrome pixel, thereby compressing the aspect ratio, and the eyepiece decompresses the aspect ratio.

11. The anamorphic eyepiece of claim 1 wherein the anamorphic eyepiece consists of not more than six lens elements.

12. The anamorphic eyepiece of claim 11 wherein the anamorphic eyepiece consists of not more than five lens elements.

13. The anamorphic eyepiece of claim 11 wherein at least two of the lens elements form a doublet that corrects for chromatic aberration.

14. The anamorphic eyepiece of claim 11 wherein at least one of the lens elements acts as a field flattener.

15. The anamorphic eyepiece of claim 11 wherein at least one of the lens elements is a bicylinder.

16. The anamorphic eyepiece of claim 11 wherein all of the lens elements except for one, have a cylindrical surface.

17. The anamorphic eyepiece of claim 11 wherein not more than one lens element has an aspheric surface and all of the surfaces on the other lens elements are either spherical, cylindrical or planar.

18. The anamorphic eyepiece of claim 11 wherein the anamorphic eyepiece consists of not more than four lens elements.

19. The anamorphic eyepiece of claim 1 wherein at least one lens element has a toroidal surface.

20. The anamorphic eyepiece of claim 1 wherein the anamorphic eyepiece consists of lens elements, and a length from a front surface of the first lens element to a back surface of the last lens element is less than 50 mm.

21. The anamorphic eyepiece of claim 1 wherein the anamorphic eyepiece consists of lens elements, and a length from a front surface of the first lens element to a back surface of the last lens element is less than 35 mm.

22. The anamorphic eyepiece of claim 1 wherein the anamorphic eyepiece consists of lens elements, and a length from a front surface of the first lens element to a back surface of the last lens element is less than 30 mm.

23. The anamorphic eyepiece of claim 1 wherein the anamorphic eyepiece consists of lens elements, and a total weight of the lens element is less than 100 grams.

24. The anamorphic eyepiece of claim 1 wherein the anamorphic eyepiece consists of lens elements, and a total weight of the lens element is less than 55 grams.

25. The anamorphic eyepiece of claim 1 wherein the anamorphic eyepiece consists of lens elements, and a total weight of the lens element is less than 40 grams.

26. The anamorphic eyepiece of claim 1 wherein the anamorphic eyepiece has a vertical resolution of not worse than 0.5 cycles/mrad.

27. The anamorphic eyepiece of claim 1 wherein the anamorphic eyepiece has a horizontal resolution of not worse than 1.0 cycles/mrad.

28. The anamorphic eyepiece of claim 1 wherein an eye relief of the eyepiece is at least 20 mm.

29. The anamorphic eyepiece of claim 1 wherein an eye relief of the eyepiece is at least 25 mm.

30. The anamorphic eyepiece of claim 1 wherein an eye relief of the eyepiece is at least 30 mm.

31. The anamorphic eyepiece of claim 1 wherein on-axis exit pupil is at least 10 mm.

32. The anamorphic eyepiece of claim 1 wherein on-axis exit pupil is at least 12 mm.

33. The anamorphic eyepiece of claim 1 wherein on-axis exit pupil is at least 15 mm.

34. The anamorphic eyepiece of claim 1 wherein off-axis exit pupil is at least 5 mm.

35. The anamorphic eyepiece of claim 1 wherein off-axis exit pupil is at least 7 mm.

36. The anamorphic eyepiece of claim 1 wherein off-axis exit pupil is at least 10 mm.

37. An anamorphic eyepiece for use in a display system configured to be positioned near a user's eye, the display system further comprising a display having at least 1600 pixels in a horizontal direction, the anamorphic eyepiece projecting an image produced by the display into the user's eye and expanding an aspect ratio of the projected image compared to an aspect ratio of the display, the anamorphic eyepiece having a vertical resolution of not worse than 0.5 cycles/mrad and a horizontal resolution of not worse than 1.0 cycles/mrad.

* * * * *